Feb. 16, 1960 S. W. DANIEL 2,925,549
ELECTRIC POWER RESPONSIVE SYSTEM
Filed Aug. 14, 1956 2 Sheets-Sheet 1

INVENTOR
STEWART W. DANIEL
By- Smart & Biggar
ATTORNEYS

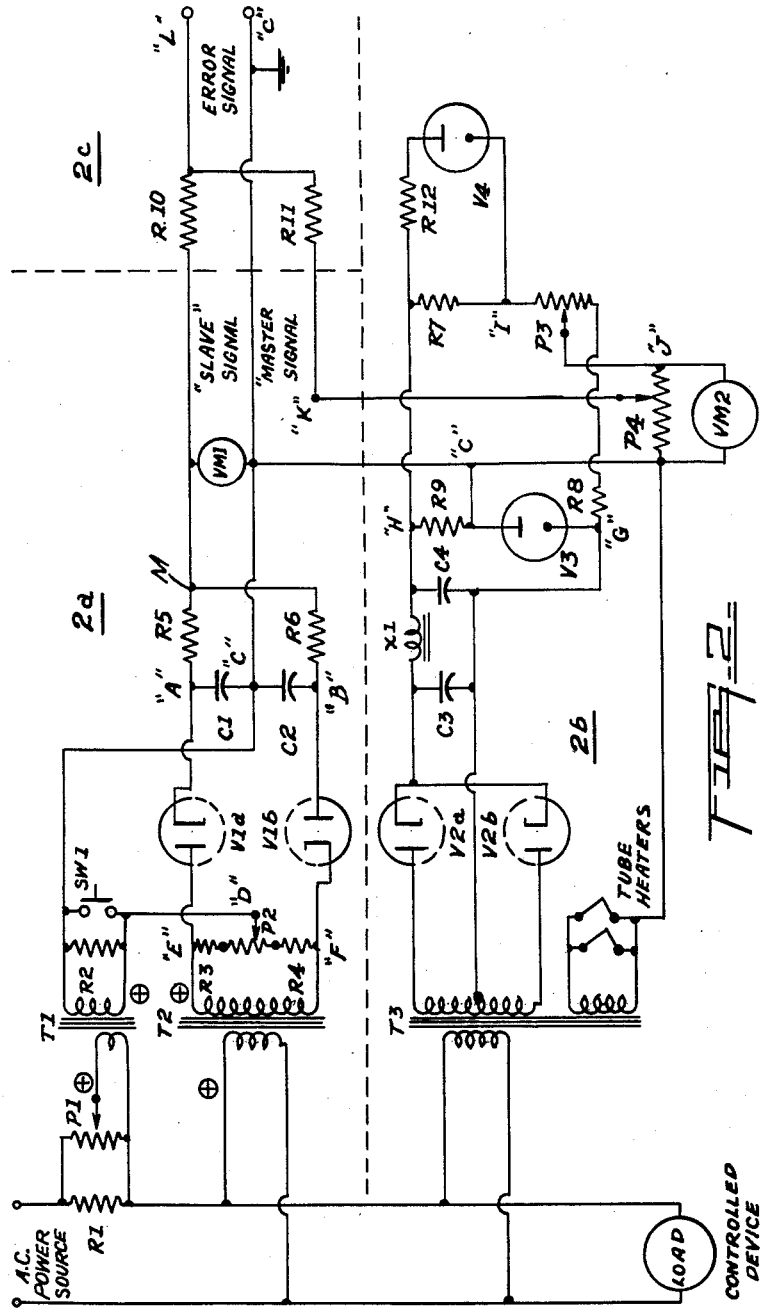

United States Patent Office 2,925,549
Patented Feb. 16, 1960

2,925,549

ELECTRIC POWER RESPONSIVE SYSTEM

Stewart W. Daniel, Peterborough, Ontario, Canada, assignor to Milltronics Limited, Toronto, Ontario, Canada Application August 14, 1956, Serial No. 603,922

Claims priority, application Canada October 3, 1955

6 Claims. (Cl. 323—66)

This invention relates to an apparatus for indicating the deviation from a predetermined value of the alternating current power supplied to a controlled device such, for instance, as an alternating current electric motor or an electric furnace or any other electric power consuming devices in connection with which it is desired to ascertain the power load during operation.

There is substantial demand in the art for a device of the above-mentioned character for use particularly in connection with control devices which are used either for maintaining a constant power load in the controlled device or varying conditions of operation in devices associated with the controlled device in accordance with variations in the power load. Conventional watt meters and the like are unsatisfactory for this purpose because they do not produce an electrical signal proportional to power which can be used effectively as a control signal.

According to the present invention, a relative indication of the deviation from a predetermined value of the alternating current electric power supplied to the load is provided by measuring the current flow through the load, measuring the voltage across the load, combining these quantities to produce a unidirectional slave voltage proportional to the said current flow multiplied by the power factor of the load, comparing this slave voltage to a master voltage which is adjusted to a desired value which is substantially proportional to the electric power supplied to the load, and deriving a difference voltage which is indicative of deviation of the power supplied to the load from a desired value. By thus in effect measuring the deviation of power supplied, difficulties arising through variation in line voltage and power factor are avoided and a substantially linear relationship between power supplied and the difference voltage is obtained over a reasonable operating range on either side of the supplied power value which corresponds to the master voltage which is selected.

The invention will be further described with reference to the accompanying drawings in which:

Figure 2 is a schematic circuit diagram of the apparatus required to produce the error signal referred to in Figure 1.

Figure 1:
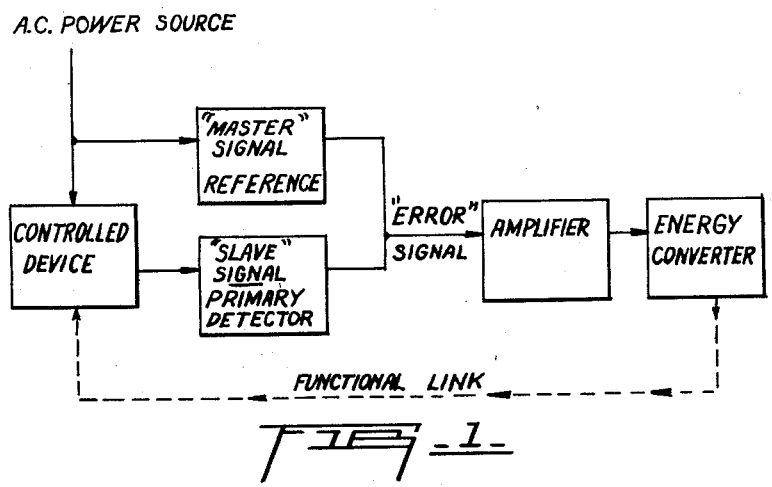
Figure 1 is a block diagram of apparatus according to the invention.

A general arrangement of apparatus in accordance with the invention is shown in the block diagram of Figure 1. Alternating current power is fed to a controlled device and also supplies the reference or master signal. A signal is derived from the controlled device, which in this specification is referred to as a slave signal, and by comparison of this slave signal with the master signal an error signal is produced. The error signal is amplified and supplied to an energy converter which is connected through a functional link back to the controlled device. In this apparatus the electric power consumed by the controlled device is evaluated in terms of an increase or decrease in power above or below a preselected reference point which is set by the master signal. This departure from a preselected reference point is expressed as a unidirectional voltage which is indicated in Figure 1 as the error signal. The polarity and magnitude of the error signal is a measure of the direction and magnitude of the departure from the reference point of the electric power consumed by the controlled device. The controlled device might be an alternating current motor either single or multiphase, with the loading of the motor dependent upon a functional link consisting of the feeding of material from a conveyor belt. Or the controlled device might be an electric furnace with the power consumption dependent upon a functional link consisting of saturable core reactors in the furnace line or a functional link changeable with the position of the electrodes in an arc furnace.

To simplify the description of the circuit shown in Fig. 2 the description is arranged under the following headings: "Slave signal circuit," "Master signal circuit," and "Error signal circuit."

Slave signal circuit

The slave signal is produced by the part of the circuit designated as 2a in Figure 2 and divided from the other parts of the circuit by dotted lines. The following are the components of circuit 2a, the values given being examples which may vary from one design of the circuit to another:

| | |
|---|---|
| Transformer T1 | 2.5–2.5 volts/115 volts transformer. |
| Transformer T2 | 115 volts/120 volts transformer. |
| Resistor R1 | 0.6 ohm, 20 watts. |
| Resistor R2 | 5100 ohms, 1 watt. |
| Resistors R3 and R4 | 2400 ohms, 1 watt. |
| Resistors R5 and R6 | 24,000 ohms, 1 watt. |
| Capacitors C1 and C2 | 10 mfd., 450 volts. |
| Vacuum tube V1 | Type 6H6 double-diode. |
| Potentiometer P1 | 2 ohms, 50 watts. |
| Potentiometer P2 | 2000 ohms, 2 watts. |
| Voltmeter VM1 | 80 volts direct current voltmeter. |

The object of the circuit shown in part 2a of Figure 2 is to supply a slave signal voltage proportional to the load current multiplied by the cosine of the angle between the load current and the load voltage. The cosine of the angle between the load current and the load voltage, or phase angle, is the power factor of the load. The load, which is the controlled device, is designated "load" in Figure 2 and is shown supplied with single phase power from an alternating current power source. The slave signal voltage appears across the voltmeter VM1.

The alternating current supplied to the load flows through a series resistor R1 and a parallel connected potentiometer P1 so that a voltage proportional to load current is available from the movable arm of the potentiometer P1. This voltage is stepped-up in transformer T1 and applied to terminals C and D of a 4-arm network having main terminals A, B, E and F. This network is energized by transformer T2 having its primary connected across the load circuit and its secondary connected to terminals E and F. The arm E–F of the network is formed of series connected resistors R3 and R4 and potentiometer P2 having a variable contact connected to terminal D. Arm E–A is formed of rectifier V1a, and arm F–B is formed of reversely connected rectifier V1b, while arm A–B is formed of series connected condensers C1 and C2. The terminal C is the common terminal for these condensers. The voltage applied from transformer T1 to the points C and D will be proportional to the voltage across the resistor R1 multiplied by the ratio of the transformer T1 and, in the particular design shown in the drawing, this voltage will be approximately 40 volts at rated load current. The resistors R3 and R4 and the potentiometer P2 in connection with rectifiers V1a and V1b are used to obtain equal D.C. voltages across the capacitors C1 and C2 proportional to the A.C. load voltage when the load current is zero. The potentiometer P2 serves as a zero adjustment.

The rectifier tubes V1a and V1b are connected so that one rectifier produces a D.C. voltage proportional to load voltage plus the voltage proportional to load current and the other rectifier produces a D.C. voltage proportional to load voltage minus the voltage proportional to load current respectively. In effect, the voltage C to D is added to the voltage D to E and then rectified by tube V1a to charge condenser C1. The voltage C to D is subtracted from the voltage D to F and then rectified by tube V1b to charge condenser C2.

The capacitors C1 and C2 are connected in opposing relation to a common output terminal M through mixer resistors R5 and R6. The slave signal voltage, which appears across terminals M and C as indicated by meter VM1 is equal to $$\frac{C1 \text{ voltage} - C2 \text{ voltage}}{2}$$

When the load current is zero the voltage between points C and D will be zero. With the potentiometer P2 correctly adjusted the voltage between the points C and E will equal the voltage between the points C and F. The capacitor C1 tends to charge up to the peak of the voltage between the points C and E and, therefore, the D.C. voltage across the capacitor C1 will be approximately 1.3 times the R.M.S. value of the voltage between the points C and E. With a load voltage of 115 volts R.M.S., the voltage at the secondary winding of the transformer T2 will be 120 volts, and the voltage between the points E or F and D will be 60 volts R.M.S. The voltage across either of the capacitors C1 or C2 will be 60 times 1.3 which equals 78 volts.

When the ratio of $$\frac{\text{The resistance of R5}}{\text{The resistance of R6}}$$

and $$\frac{\text{The voltage across C1}}{\text{The voltage across C2}}$$

equals 1.0, then the slave signal will equal zero volts. The ratio $$\frac{\text{Voltage across C1}}{\text{Voltage across C2}}$$

will only equal 1.0 under three conditions, that is, when the load voltage is zero, when the load current is zero, or the load current is 90° out of phase with the load voltage.

Assuming the voltage D to E is 60 volts R.M.S., the voltage D to F is 60 volts R.M.S., the voltage D to C is 40 volts R.M.S., and the phase angle between load voltage and load current is 0°, then, the voltage C to A will be $(60+40) \times 1.3 = 130$ volts, the voltage C to B will be $(60-40) \times 1.3 = 26$ volts, the voltage of the slave signal will be $$\frac{130-26}{2} = 52 \text{ volts}$$

If the load current drops to 50%, then the voltage D to C will be 20 volts R.M.S., the voltage C to A will be $(60+20) \times 1.3 = 104$ volts, the voltage C to B will be $(60-20) \times 1.3 = 52$ volts, the voltage of the slave signal will be $$\frac{104-52}{2} = 26 \text{ volts}$$

Assume now that the power factor of the load is 50%: With a D to E voltage of 60 volts R.M.S., D to F voltage of 60 volts R.M.S., D to C voltage of 40 volts R.M.S., with a phase angle $\phi$ of 60° (.5 P.F.) between load current and load voltage, the voltage C to A will be $$(60 + \cos \phi \times 40) \times 1.3 = 104 \text{ volts}$$

the voltage C to B will be $$60 - \cos \phi \times 40) \times 1.3 = 52 \text{ volts}$$

the slave signal will be $$\frac{104-52}{2} = 26 \text{ volts}$$

From these three examples it will be seen that the D.C. voltage or "error signal" across VM1 remains proportional to the power of the load even though the load changes in amount and in power factor.

Because of the loading effect (the current through the voltmeter VM1 and the slave signal current through the resistor R10) on the circuit C1, C2, R5 and R6, the slave signal voltage will be somewhat less than in the examples given above. This however, does not introduce any error that detracts from the object of the circuit.

The potentiometer P1 is adjusted until the C to D voltage is approximately 40 volts R.M.S. at the rated load current of the controlled device. The switch SW1 is closed when setting the potentiometer P2 (zero adjustment) for a slave signal voltage of zero.

Figure 3:
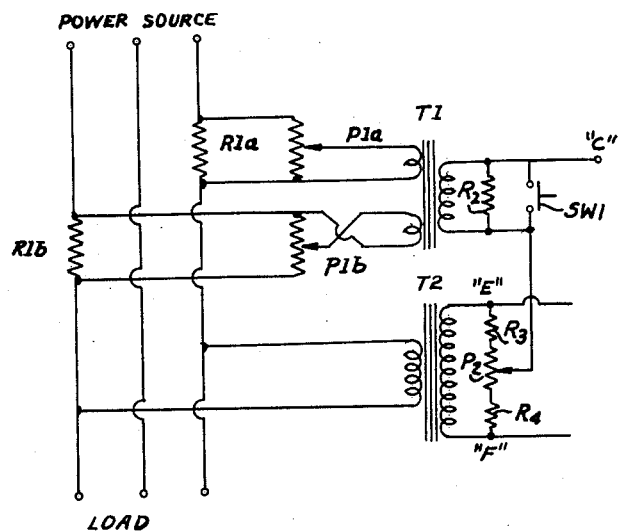
Figure 3 is a schematic circuit diagram showing how the apparatus shown in Figure 2 can be connected to a source of three-phase power for a balanced load.

Figure 3 shows connections which can be used when the slave signal is to be derived from a balanced load connected to a source of 3 phase power.

*Master signal circuit*

The master signal is produced by the part of the circuit designated as 2b in Figure 2 and divided from the other parts of the circuit by dotted lines. The following are the components of circuit 2b, the values being examples which may vary from one design of the circuit to another:

Transformer T3 _____ 115 volts/200–20.0–6.3 volts transformer.
Vacuum tube V2 ___ Type 6×5 double-diode.
Vacuum tube V3 ___ Type VR105 regulator tube.
Vacuum tube V4 ___ Type VR75 regulator tube.
Capacitors C3 and C4 _____ 10 mfd., 450 volts.
Choke X1 _____ 10 henry reactor.
Resistor R7 _____ 15,0000 ohms, 10 watts.
Resistor R8 _____ 2,200 ohms, 1 watt.
Resistor R9 _____ 10,000 ohms, 10 watts.
Resistor R12 _____ 12,000 ohms, 1 watt.
Potentiometer P3 ___ 5,000 ohms, 2 watts.
Potentiometer P4 ___ 50,000 ohms helio-potentiometer.
Voltmeter VM2 _____ 80 volts direct current voltmeter.

The object of the master signal circuit shown in part 2b of Figure 2 is to supply a voltage capable of manual presetting to a desired level of reference voltage. The circuit is so arranged that the magnitude of this reference voltage varies in an inverse manner with variations in the voltage at the load. For example, a 5% increase in load voltage will result in a decrease in the reference voltage with the purpose of forcing the system to decrease the slave signal by 5%.

The secondary winding of transformer T3 and the vacuum tube V2 form a full wave rectifier to product a pulsating direct voltage across the capacitor C3, the primary of transformer T3 being connected across the load circuit. The capacitors C3, C4 and reactor X1 form a conventional low-pass filter to produce a substantially ripple free D.C. voltage between terminals H and G which voltage is proportional to load voltage. The resistor R9 connects a regulator tube V3 across terminals H and G. This resistor determines the current flow through the regulator tube V3, and is chosen to allow operation of this tube within its current ratings. The regulator tube V3 has one electrode connected to terminal G and the other connected to terminal C which is common to several circuit elements as shown. Tube V3 operates at a constant potential drop and ensures that the voltage between C and G is constant at 105 volts, irrespective of changes in the G to H voltage. The resistors R7, R8 and potentiometer P3 are connected in series across terminals H and G and form a voltage divider network. A potentiometer P4 is connected between terminal C and terminal J which is connected to the sliding contact on potentiometer P3. The master signal is taken from the sliding contact of P4 and applied to terminal K. The potentiometer P3 may be adjusted for a J to C voltage of 52.5 volts when the load voltage is 115 volts R.M.S. This voltage is applied across potentiometer P4 and is indicated by voltmeter VM2 connected across P4. This voltage is derived from the constant drop across V3, the drop across R8 and the drop across the lower part of P3.

Assuming a load voltage of 115 volts R.M.S., C to G voltage of 105 volts D.C., J to G voltage of 52.5 volts D.C., then, the voltage J to C will be 105—52.5 volts D.C.

If the load voltage increases by 5% to $$115+5.75=120.75 \text{ volts R.M.S.}$$

then, the C to G voltage will remain constant at 105 volts D.C., the J to G voltage will be $$52.5+5\%=55.125 \text{ volts D.C.}$$

the J to C voltage will be 105–55.125=49.875 volts D.C. This reduction in the master voltage to $$\left(\frac{49.875}{52.5}\right)=95\%$$

will force the feedback system to reduce the slave signal to 95%. The 95% load current times 105% load voltage will result in a load power of 99.75%. The .25% error is a very minor one.

For a decrease in load voltage to 95% of 115 volts R.M.S, the C to G voltage will remain at 105 volts D.C., the J to G voltage will be 95% to 52.5 volts=49.875 volts D.C., the J to C voltage will be 105—49.875=55.125 volts D.C.

This increase of the master voltage to $$\left(\frac{55.125}{52.5}\right)=105\%$$

will force the feedback system to increase the slave signal to 105%. The 105% load current times 95% load voltage will result in a load power of 99.75%. The .25% error is a very minor one.

The master potentiometer P4 allows the manual selection of the desired master voltage signal. The voltage K to C will always be proportional to the voltage J to C.

The voltmeter VM2 is convenient when setting potentiometer P3 for a J to G voltage of 52.5 volts at the mean or average value of load voltage, i.e. if the load voltage varies between 100 and 120 volts R.M.S. The J to G voltage of 52.5 volts should be established with a load voltage of 110 volts R.M.S. Because of the loading effect (of the voltmeter VM2 and the potentiometer P4), and the regulation of the power supply (transformer T3, vacuum tube V2, filter C3, C4, X1, etc.) on the J to C voltage, the master signal voltage increase or decrease will be somewhat different than in the examples given above. A means of compensating for this difference consists of a regulator tube V4 and a resistor R12 connected across resistor R7.

The current flow through the potentiometer P3 will be divided between the resistors R7 and R12. An increase in the G to H voltage will proportionately increase the current flow through R7. An increase in the G to H voltage will more than proportionately increase the current flow through R12. By careful selection of the value of resistor R12, the J to C voltage may be made to exactly decrease as the load voltage increases. When using the regulator tube V4 and resistor R12, it is advisable to make the J to G voltage 52.5 volts at the lowest value of load voltage encountered from the power source.

*Error signal circuit*

The error signal is produced by the part of the circuit designated as 2c in Figure 2 and divided from the other parts of the circuit by dotted lines. The following are the components of circuit 2c, the values given being examples which may vary from one design of the circuit to another:

Resistors R10 and R11 which connect the slave signal and the master signal to a common output terminal L, in opposed polarity relation, may each be of 200,000 ohms, 1 watt.

The object of the circuit shown in part 2c of Figure 2 is to compare the slave signal with the master signal so as to produce a difference signal. This difference signal has a magnitude proportional to the amount of difference between the slave and master signal voltages, and a polarity indicative of which is greater. The resultant error signal appears across the terminals marked L and C in Figure 2.

The slave signal (voltage VM1), the master signal (voltage K to C) and resistors R10, R11, form the four arms of a direct current bridge. It should be noted that the slave signal is more positive than C and that K is more negative than C.

When the ratio of $$\frac{\text{Resistance of R10}}{\text{Resistance of R11}}$$

and the ratio of $$\frac{\text{Voltage VM1}}{\text{Voltage K to C}}=1.0$$

the bridge is balanced and error voltage (L to C) will be zero volts.

If the slave signal is greater in magnitude than the master signal, the error voltage (L to C) will be positive by an amount equal to half of the difference between the slave signal voltage and the master signal voltage.

If the master signal is greater in magnitude than the slave signal, the error voltage will be negative by half the difference between the master signal voltage and the slave signal voltage.

The error signal is usually applied to an electronic amplifier. The electronic amplifier output is used to either increase or decrease the power to the functional link to the controlled device as represented by the dotted line in Figure 1. In Figure 1, for example, if the power consumption of the controlled device increases, the slave signal will become more positive, the error signal will become more positive, the amplifier will amplify this positive error voltage, and the energy converter will decrease the effect of the functional link until the power consumption is returned to normal.

If the load voltage increases, the power consumption increases, but the master signal will decrease due to the action of regulator tube V4. The error signal will become more positive, the amplifier will amplify this positive error voltage, and the energy converter will decrease the effect of the functional link until the power consumption is returned to normal.

*General*

The components shown and described for the circuit of Figure 2 are examples and it is within design skill in this art to substitute other components. For example, the vacuum tubes V1 and V2 may be replaced by other types of rectifiers such as germanium, selenium or copper oxide rectifiers. The transformer T3 and the vacuum tube V2 could be replaced with a half-wave rectifier. The choke X1 might be a resistor and the filter C3 and C4 and X1 might be re-arranged as a choke input filter which would provide improved regulation.

The voltage C to G may be derived from an external regulated voltage source. This voltage may be other than 105 volts, provided that the voltage J to G is approximately half of the G to C voltage.

The resistors R3 and R4 and the potentiometer P2 may be replaced by a centre tap on the secondary of transformer T2. A zero adjustment may be obtained by varying the ratio of R5 to R6. The potentiometer P4 may be replaced by varying the ratio of the resistors R10 to R11. The transformers T2 and T3 can be combined in a single transformer.

It may be desirable in some designs to have the slave signal voltage negative with respect to the point C. In that case the master signal voltage must be made positive with respect to the point C.

Resistors R7, R12, and tube V4 could be replaced with a non-linear resistive device that will allow a more than proportional increase in current in the potentiometer P3 when the voltage G to H is increased.

What I claim as my invention is:

1. Apparatus for producing a direct-current signal proportional to the alternating electric power supplied to a load, comprising a pair of rectifier circuits each including a capacitor to be charged by rectified current, means supplying one rectifier circuit with a voltage proportional to the load current and a second voltage proportional to load voltage, whereby the condenser in said one circuit is charged to a voltage according to the resultant voltage in said one circuit, means supplying the other rectifier circuit with two voltages identical with the voltages supplied to said one circuit but with one voltage in the second circuit reversed in phase with respect to the corresponding voltage in the said one circuit, whereby the other condenser is charged to a voltage in accordance with the resultant voltage in said other circuit, an output circuit, and means connecting said condensers to said output circuit in opposing polarity relation to produce an output signal dependent upon the difference in charge on said condensers.

2. Apparatus as defined in claim 1 comprising means to supply a unidirectional master voltage adjustable to a desired value corresponding to a desired power consumption of the load, means to compare the voltage proportional to the power applied to the load with said master voltage to produce a difference voltage, and means controlled by said difference voltage for adjusting the power consumption of said load.

3. Apparatus for producing a direct-current signal proportional to the alternating current electric power supplied to a load, comprising a four-arm bridge having two of its arms formed of two capacitors with a common point of connection and the other two arms formed of two resistors with a common point of connection, means to supply across one of said capacitors a direct current voltage proportional to the sum of a voltage proportional to load current and a voltage proportional to load voltage and to supply across the other of said capacitors a direct current voltage proportional to the difference between the voltage proportional to load current and the voltage proportional to load voltage, and an output circuit connected across said two common points of connection, said capacitors being connected to said output circuit in opposing polarity relation and producing in said output circuit a direct-current proportional to the difference in charges on said capacitors.

4. Apparatus as defined in claim 3 comprising means to supply a unidirectional master voltage adjustable to a desired value corresponding to a desired power consumption of the load, means to compare the direct-current voltage indicative of the power supplied to the load with said master voltage to produce a difference voltage, and means controlled by said difference voltage for adjusting the power consumption of said load.

5. Apparatus for indicating the deviation from a predetermined value of the alternating current electric power supplied to a load, comprising means to derive an alternating voltage proportional to the current flow through the load, means to derive a second alternating voltage proportional to the voltage across the load, means to combine said derived voltages and to deliver a unidirectional slave voltage proportional to said current flow multiplied by the power factor of the load, means to supply a unidirectional master voltage adjustable to a desired value, and means to combine the slave voltage with the master voltage to produce a difference voltage indicative of said deviation.

6. Apparatus as defined in claim 5 comprising means responsive to the load voltage and operating automatically to change the magnitude of the master voltage in a direction opposite to any change in the magnitude of the load voltage thereby to prevent any substantial effect of a change in load voltage on the slave voltage.

References Cited in the file of this patent
UNITED STATES PATENTS

| | | |
|---|---|---|
| 1,442,042 | Boddie | Jan. 16, 1923 |
| 2,181,321 | Friedlander | Nov. 28, 1939 |
| 2,798,196 | Hage | July 2, 1957 |